INVENTOR
WILLIAM H. BURKHART
BY William L. Glover
AGENT

INVENTOR
WILLIAM H. BURKHART
BY William S Glover
AGENT

Feb. 16, 1960 W. H. BURKHART 2,925,591

MEANS FOR DIAGNOSING FUNCTIONAL ILLS OF ELECTRICAL AND ELECTRONIC EQUIPMENT

Filed June 28, 1954 4 Sheets-Sheet 3

INVENTOR
WILLIAM H. BURKHART
BY William L. Glover
AGENT

INVENTOR
WILLIAM H. BURKHART
BY William L. Glover
AGENT

United States Patent Office 2,925,591 Patented Feb. 16, 1960

2,925,591

MEANS FOR DIAGNOSING FUNCTIONAL ILLS OF ELECTRICAL AND ELECTRONIC EQUIPMENT

William Henry Burkhart, East Orange, N.J., assignor to Monroe Calculating Machine Company, Orange, N.J., a corporation of Delaware Application June 28, 1954, Serial No. 439,675

20 Claims. (Cl. 340—213)

This invention relates to a method of and means for diagnosing the functional ills of electrical and electronic equipment, particularly electronic computers and the like.

The maintenance of complex electrical and electronic equipment such, for example, as computers, presents an unusual problem. The repair of any individual circuit of the equipment may be relatively simple. However, the location of the particular circuit at fault among, possibly hundreds or thousands of faultless circuits, poses a problem of major proportions.

Duplicate circuits have been utilized in complex equipment for the purpose of detecting the occurrence of errors through comparison of the results achieved by the two. This may be carried a step further to locate faulty circuits by comparing not only the outputs of the duplicate circuits, but also various corresponding key points therein. The corresponding key points which are located, functionally, between a faulty circuit and the output of the equipment will not match, or compare, while the key points which precede the faulty circuit will match. Thus the faulty circuit may be localized to the circuitry between the functionally most dependent key points which match and the functionally most independent key points which do not match.

In equipment which embodies feed-back loops, the problem of locating a faulty circuit becomes even more perplexing since functional errors due to faulty circuits are propagated not only throughout the circuits functionally located between the faulty one and the output of the equipment, but also back through the feed-back loops to some or all of the circuits from which the faulty one depends functionally. Conceivably every circuit, save input buffers or the like, may function erroneously due to faulty operation of a single circuit. Evidently the method of locating faulty circuits described above is not applicable to this type of equipment.

The principal object of the invention, therefore, is the provision of a method and a means for diagnosing the functional ills of electrical and electronic equipment which may embody feed-back loops.

Another object of the invention is the provision of a said method which is capable of being conducted automatically and of means for so conducting the method.

According to the invention the outputs of duplicate circuits are monitored and a signal produced on the occurrence of a non-comparison or non-match. On the occurrence of this signal the equipment is halted and is conditioned for recycling through the operation in which the non-comparison appeared starting from a selected error free point in the operation. Then the equipment is recycled from that point. While the equipment is being recycled one or more times a search is conducted through predetermined pairs of corresponding check points in the duplicate circuits to determine the pair or pairs of points at which the error first appears during the operation; and if the earliest appearance of the error is observed at more than one pair of points, the pair which is functionally independent of the others is determined. Thus, the faulty component which caused the error is isolated to the circuitry immediately associated with a pair of check points. All that remains then is to pick out and repair or replace the offending components.

The means of the invention may comprise manually or an automatically operable switching means for scanning the check points. The comparisons may be conducted visually or by electrical or electronic comparison circuits. The determination as to the relative times of occurrence of an error at the check points, that is, the order in which the check points evidence non-comparisons, may also be accomplished visually or by electrical or electronic circuits. All these electrical and electronic circuits may be of any suitable sort.

Other objects and features of the invention will become apparent from the following description when read in the light of the drawings of which:

*General method*

Figure 1:
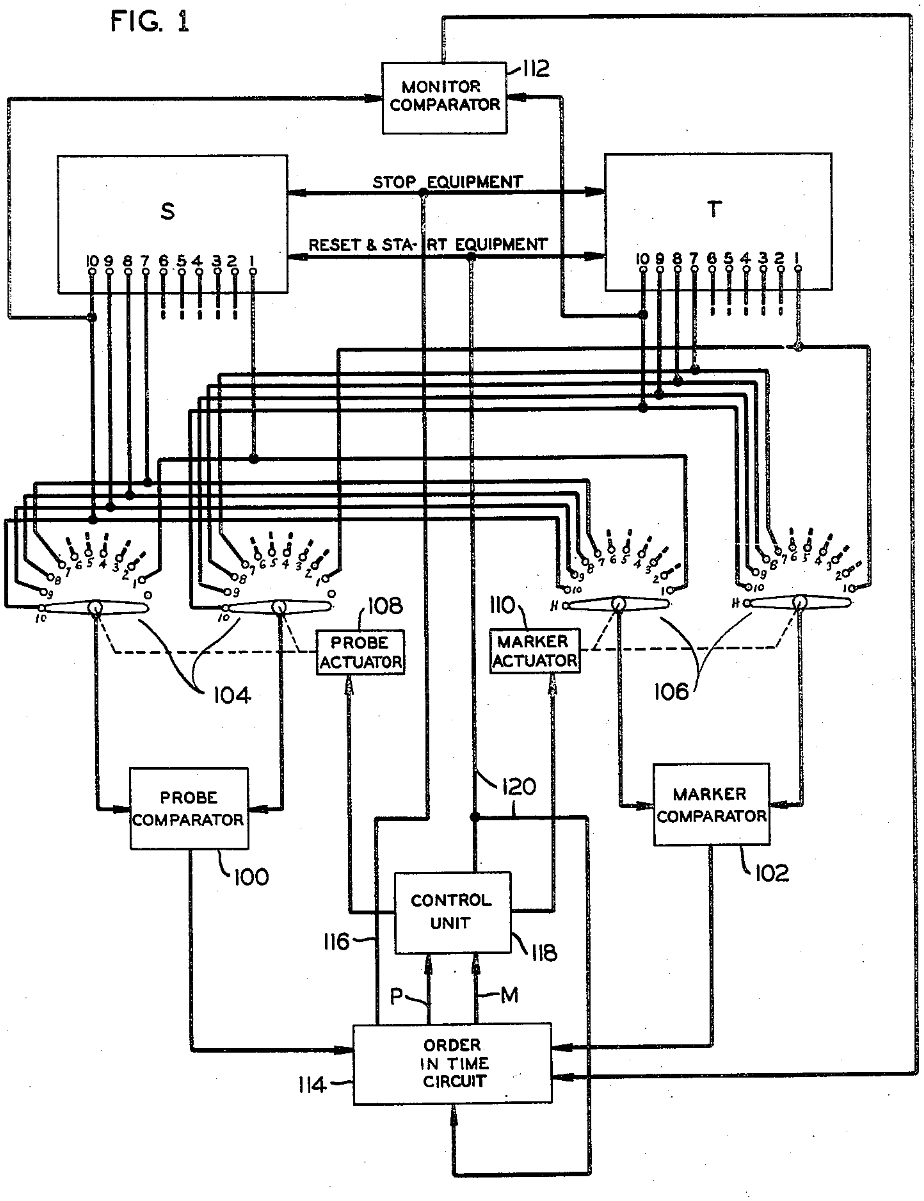
Fig. 1 is a block diagram of an illustrative form of the means of the invention.

According to the invention, automatic internal diagnosis of electrical equipment embodying duplicate circuits can be accomplished by the following method.

First, the outputs of the duplicate circuits are monitored and a signal produced on the occurrence of a non-comparison between the two which exceeds a predetermined tolerance;

Second, the equipment is stopped on the occurrence of a said signal and is conditioned for recycling through the operation in which the error which produced the non-comparison appeared starting from a selected error free point in the operation. Then the equipment is recycled from that point, and;

Third, while the equipment is being recycled one or more times a search is conducted through predetermined pairs of corresponding check points in the duplicate circuits to determine the pair or pairs of points at which the error first appears during the operation; and, if the earliest appearance of the error is observed at more than one pair of points, the pair which is functionally independent of the others is determined. Thus the faulty component which caused the error is isolated to the circuitry immediately associated with a pair of check points. All that remains, then, is to pick out and repair or replace the offending component. Ordinary maintenance techniques may be used for this.

*Detailed method*

The first step of the method may be conducted along either digital or analog lines. The monitoring may comprise gated or timed comparison of the outputs of the duplicate circuits during each information or pulse period. In this case a difference in potential or current between the outputs during the comparison interval which is greater than a predetermined amount will cause a non-comparison signal to be produced. On the other hand, the outputs of the circuits may be compared continuously and a non-comparison signal produced only when a potential or current difference that is greater than a predetermined amount exists for a longer period of time than some predetermined amount.

The signal which is produced on the occurrence of a non-comparison may be of any suitable sort. It may be visual or audible, in which cases the second step of the method would be initiated manually, or it may be electrical control signal which automatically initiates the said second step.

As indicated, the second step of the method may be initiated manually or automatically. In either case it is necessary that the equipment be recycled under the same conditions under which it originally cycled. Thus, it may be necessary to normalize the circuits of some equipment either manually or automatically prior to each recycling thereof to erase the effects of a circuit malfunction and, in an electronic calculator where an error which occurs during the *m*th cycle of the *n*th step of a complex program changes the value of a factor used earlier in the program, it may not suffice merely to recycle the calculator starting empirically from the first cycle of *n*th step, but rather it is necessary to restart the calculator from some point in the program which precedes said earlier usage of the changed factor, perhaps the beginning of the program.

This recycling of the equipment is continued as long as required to complete the third step of the method.

The third step of the method which, in itself, comprises a basic method of locating a malfunctioning circuit, may be accomplished by concurrently comparing two points in one of the duplicate circuit combinations with the corresponding points in the other, and noting which pair of corresponding points evidences the error first during a recycling of the equipment. This pair of points is then coupled with another pair on each subsequent recycling of the equipment until a pair of points is found which evidences the error even earlier or all points have been observed without finding points of earlier error occurrence. When a pair of points of earlier error occurrence is found, the process is repeated, etc.

These comparisons may be conducted along either digital or analog lines the same as the first step of the method of the invention. Where the comparisons are conducted along digital lines, that is, are timed to occur at a specific point in each information pulse period, two pairs of check points are deemed to evidence an error at the same time whenever the appearance of the error at both pairs of points are noted for the first time by the comparison means during the same comparison interval, even though the error actually may have appeared at either pair of points at any time subsequent to the preceding comparison interval. Where the comparisons are conducted along analog lines, that is, carried on continuously, two pairs of points are deemed to evidence an error at the same time only when the time span between its appearance at the two pairs of points is less than the resolution time of the means that are used to determine which of the two pairs exhibit the error earlier. By way of example, the resolution time of a pair of flip-flops arranged to be set to a given state, each on the occurrence of a non-comparison between a pair of check-points, and when so set block later such setting of the other flip-flop, is that time which is required to effect setting of either flip-flop and blocking of the other. Hereinafter, check point pairs which evidence an error at the same time as described above will be referred to as a "time group of points" or just a "time group." Thus a given circuit may include one or more time groups, each comprising one or more pairs of check points.

The time groups of check points of a circuit are readily distinguished from one another on a "time of error occurrence" basis. Where each time group includes but a single pair of check points this time distinction readily locates the pair of points most closely associated with the source of an error. However, where one or more time groups include more than a single pair of check points, the pertinent pair of points cannot be distinguished from the other pairs of the same time group on the "time of error occurrence" basis. They may, however, be distinguished one the basis of their functional dependency upon one another. To this end, any manual or automatic system for indicating which pair of check points of a time group is functionally independent of the others may be followed. Preferably, the functionally independent pair of check points of a time group is located by scanning the check points of each time group in the order of their functional dependency upon one another or in the inverse order, that is from output toward input of such circuits, or from input toward output, and marking the last or first scanned points, respectively. In describing these systems, it will be convenient to refer to the means for scanning corresponding check points of the duplicate circuits as the "Probe" and the "Marker."

*Output toward input system*

In a preferred form of the "output toward input" system, the Probe is normally conditioned to examine the outputs of the duplicate circuits while the Marker is normally conditioned not to examine any check points of the circuits. Additionally, the Probe is conditioned to advance one step following each operation of the equipment during which an error occurs. The Marker is conditioned to advance to the position held by the Probe whenever an error is detected first by the Probe or is detected at the same time by the Probe and the Marker. The order in which the Probe steps to the various check points of the circuits may be varied considerably within the scope of a simple rule. The Probe must step to the functionally next-more-independent pair of points of the time group with which it is already associated or to the functionally-most-dependent, as yet unscanned, points of another time group. Where a pair of points in a time group depend functionally from two or more other, parallel pairs of points of the group, the parallel pairs of points may be scanned in any order.

Therefore, on the occurrence of an error, the Marker is advanced to examine the outputs of the duplicate circuits while the Probe is advanced one step preparatory to the first recycling thereof. If, during the first recycling of the equipment, an error is noted first by the Marker the Probe advances preparatory to the second recycling of the equipment but the Marker continues to examine the outputs of the circuits. However, if the error is noted first by the Probe or is noted at the same time by both the Probe and Marker, the Marker is advanced to the position of the Probe and the latter is advanced one step. This operation is repeated over and over until the Probe has scanned all of the check points. At this time the Marker is connected to the pair of check points at which the error occurs earliest in time and which are functionally independent of any other check points at which it may occur at that same time. It is to be mentioned that designation of the functionally independent pair of check points of a time group is attained by advancing the Marker when the Probe and the Marker note the error at the same time.

It will be noted that the Marker is used to designate the pair of check points at which the error has been found to occur earliest while the Probe is used to search for still earlier occurrences of the error.

*Input toward output system*

According to the "input toward output" mode of operation, the Probe is normally conditioned to examine the inputs of the duplicate circuits while the Marker is conditioned not to examine any points of the circuits. On the occurrence of an error during operation of the equipment, the Marker is conditioned to scan the inputs of the duplicate circuits and the Probe is advanced one step, preparatory to recycling of the latter. Where the Probe notes an error earlier than the Marker, the Marker is advanced to the position attained by the Probe and the latter is advanced one step. Here again, the advance of the Probe follows a simple rule. The Probe must step to the functionally next-less-independent pair of points of the time group with which it is already associated or to the functionally-most-independent, as yet unscanned, points of another time group. Where two or more parallel pairs of points of a time group depend functionally upon another pair of points of the group, the parallel pairs of points may be scanned in any order.

This mode of operation is repeated again and again until the Probe has scanned all of the check points. At this time the Marker designates the check points at which the error occurs earliest and which are functionally independent of any other check points which exhibit the error at that same time.

*Design considerations*

It is to be mentioned that various changes can be made in the described scanning systems to fit individual users' equipment and requirements. For example, in the "output toward input" system, the Probes and the Markers may both be set to scan the outputs of the equipment initially while in the "input toward output" system, they may both be set to scan the inputs of the equipment initially.

At this point it is deemed desirable to interject that the choice between the two systems rests with the individual designer and is dependent upon the characteristics of the particular equipment which is to be diagnosed and the results which are desired. The selection of the points of the duplicate circuits which are to be scanned is also dependent upon the nature of the equipment and the results that are desired. If the equipment is relatively simple, the inputs and outputs of each minor circuit thereof may constitute points for scanning. On the other hand, if the duplicate circuits are relatively complex, only the inputs and outputs of relatively larger portions thereof may be used as check points. In extremely complex equipment, such as electronic calculators, more than one diagnostic unit may be desirable. For example, one may be used for each of a plurality of subdivisions of the calculator, or one may be used to scan widely divergent check points merely to localize the source of errors to a particular section of the calculator and another unit may be used for fine scanning of each such section. Further, one diagnostic unit may be used to scan one pair of check points of each time group of points in order to localize the source of the error to one such time group, and another unit used to scan the points of the selected group.

*Sample operation*

Figure 5:
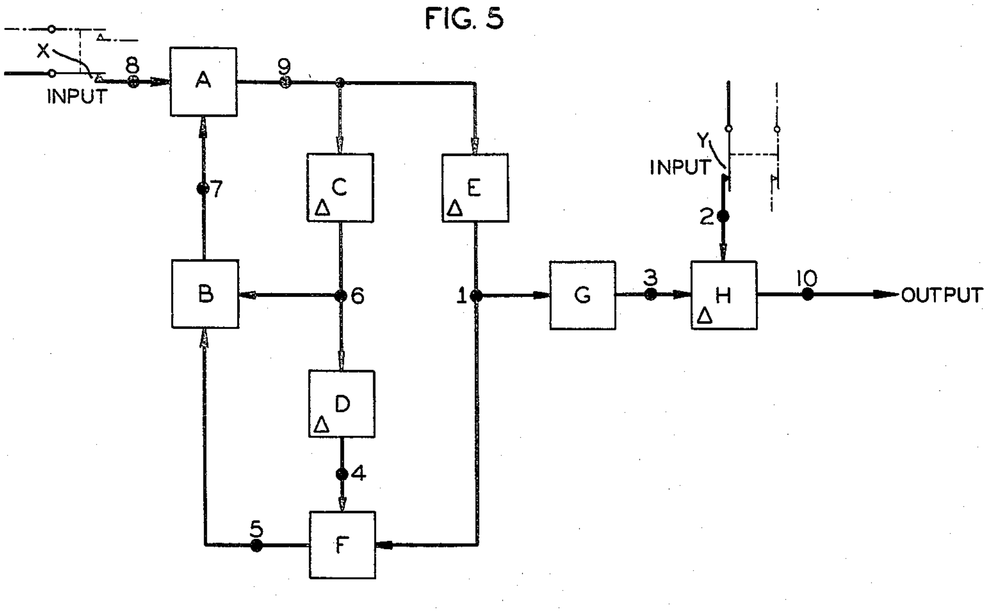
Fig. 5 is a block diagram of a circuit to which the method and means of the invention are applied by way of example.

In order to facilitate an understanding of the method of the invention an exemplary operation thereof will now be described in connection with the dual circuits S and T of Fig. 1. Each of these circuits as indicated in Fig. 5 comprises a series of individual circuit units A, B, C, D, E, F, G and H of which units C, D, E and H include delay producing means while the others do not. An input is provided to unit A through a switch X and an input is provided to unit H through a switch Y. The output of the circuit is taken from unit H. The interconnections between the units A—H are clearly indicated and need not be described except to state that all such connections, and also the inputs and outputs of the circuit, may operate on any suitable voltage levels, for example +60 and +90 volts. It will be understood, of course, that circuits S and T form no part of the invention and may be of any suitable sort.

The first step of the method of the invention may be carried out by monitoring the outputs of the circuits S and T, that is, the outputs of the units H, by any suitable means. For example, a simple voltage difference meter may be used, in which case, the error indicating signal might comprise a meter reading above a predetermined amount.

The second step of the method may be accomplished by opening the switches X and Y manually on the occurrence of said signal and then reclosing the same simultaneously to effect each recycling of the equipment. For convenience it will be assumed that the circuits A—H normalize automatically on opening of the switches X and Y, thus eliminating the need for normalizing the same manually or otherwise.

The third step of the method may be carried out by using a pair of suitable comparison devices to compare voltages at corresponding check points in the two circuits S and T to indicate which pair of check points evidence an error first. Again, a simple voltage difference meter may be used as a Probe and another as a Marker and the relative times of occurrence of the error at each determined visually. This Probe and Marker would be advanced from point to point manually.

By way of example, it will be assumed that a circuit component failed in unit B of the circuit of Fig. 5. On failure of the said component and the occurrence of a disagreement between the outputs of the dual circuits, the Probe which has been conditioned to scan the outputs of the circuits, check points 10 in Fig. 1, is advanced to scan check points 9. Since unit H (Fig. 5) which separates check point 10 from the functionally preceding check point in each circuit includes delay producing means, check point 9 may be the final check point of any time group of such points. As shown in Fig. 5 check point 9 is the final check point of a time group which also includes check points 8, 7, 6, 5, 4 and 1.

At the same time, the Marker is advanced to scan check points 10 of the dual circuits. Reoccurrence of the error during the first recycling of the equipment is first noted by the Probe at check points 9 and later by the Marker at check point 10. Therefore, the Probe is advanced to check points 8 and the Marker is advanced to check points 9 preparatory to a second recycling of the equipment. During the second recycling of the equipment the error is first noted by the Marker, the Probe being set to scan check points 8 which are inputs of the dual circuits and thus do not reflect the error caused by malfunctioning of unit B. Therefore, preparatory to the third recycling of the equipment, the Probe advances to check points 7 but the Marker is not advanced from check points 9. During the third recycling of the equipment the error is noted at the same time by the Probe and the Marker and the latter is advanced to check points 7 while the former is advanced to check points 6. During the fourth recycling of the equipment the error is noted first by the Marker which does not advance from check points 7. The Probe, however, advances to check points 5 preparatory to the fifth recycling of the equipment. The last mode of operation is repeated preparatory to the sixth and succeeding cycles of the equipment until the Probe has scanned all of the check points, since points 7 at which the Marker is positioned, are located at the outputs of the units B and thus pinpoint the source of errors (one of the units B) better than any other points.

Once the Probe has scanned all of the check points, ordinary maintenance techniques may be used to determine which of the units B is at fault and to repair or replace the malfunctioning component thereof. Also, the Probe and the Marker are restored to their initial settings.

It is deemed worthwhile to point out at this time that in the arrangement of Figs. 1 and 5, points 9, 8, 7, 6, 5, and 4 are scanned in succession one after the other, but that points 1 of the same time group are not scanned immediately following points 4. Rather, following the scanning of points 4 the Probe is stepped to scan points 3 which are in another time group which also includes points 1. This mode of operation is permissible under the rule set forth above for stepping the Probe as points 3 are the least independent unscanned points in their time group. Following the scanning of points 3 the Probe steps to points 2 which are entirely independent of any other points, and then finally steps to points 1 which are the least independent, unscanned points in their time group.

In the described manner of accomplishing the third step of the method of the invention, the check points which evidence an error earliest are located through an exhaustive analysis of the relative times at which all of the check points evidence the error. The actual time at which the error is evidenced by each pair of check points is not determined. In some instances it may be found advantageous to locate the check points which evidence an error earliest by noting the actual time at which each pair of check points evidences an error during a recycling of the equipment. To this end, the said third step of the method may be modified by: (*a*) scanning the check points in predetermined order as described above, one pair per recycling of the equipment; (*b*) counting the pulse periods of each recycling up to the one in which the check points being scanned evidence an error, or otherwise obtaining an indication of the time at which the error is evidenced; (*c*) recording the time at which each pair of points evidences an error; and, (*d*) scanning the recorded times to determine which is the earliest.

Practically, the pulse periods of each operation of the equipment may be counted by a binary counter in accordance with familiar computer techniques. Additionally, the counting may be stopped in known manner on the occurrence of an error. The recording of the counts which the counter attains during each recycling of the equipment may be performed manually or, if desired, automatically as by controlling a printer or the like differentially in accordance with the counting states attained by the counter.

*Plural errors*

In the event two or more circuit components fail at substantially the same time, performance of the method of the invention will locate the check points associated with the component whose fault first produces an error. However, replacement or repair of this component will not affect the faulty condition of any other which will again produce an error to initiate another performance of the method of the invention, and so on. Evidently, repeated performances of the method will locate all of the faulty components.

*Transient errors*

The method of the invention is also capable of locating the sources of transient errors in electrical equipment. To accomplish this the Marker and Probe are not reset to their initial positions if an error fails to recur during a recycling of the equipment. Rather the equipment is put back into operation until at some later time the error does recur, at which time, the Marker and the Probe are advanced from the positions which they had previously attained and so on. In this manner, the Marker and the Probe are operated intermittently to the same effect as described above in connection with uninterrupted operations, that is, the source of the errors is finally located and designated by the Marker.

This mode of operation is particularly valuable in that it does not necessitate inactivity of the equipment all during the trouble-shooting period, but only for one or more brief recyclings thereof on each occurrence of a transient error.

*Preventive maintenance*

It is customary in the operation of complex electrical equipment such, for example, as electronic computers, to schedule regular, periodic preventive maintenance procedures adapted to locate deteriorating circuit components before they fail and effect a misoperation of the equipment. One such procedure is to lower the filament supply voltage for the vacuum tubes in the equipment to effect premature failures of seriously deteriorated tubes. The same effect may also be achieved by lowering the anode supply voltage for the tubes.

The effectiveness of this and other known procedures is dependent upon the speed with which maintenance personnel can locate any tubes which do fail. If long periods of time are consumed in searching for these tubes, as is usually the case, the overall operating efficiency of the equipment is lowered.

The method of the invention, when used in conjunction with these known preventive maintenance techniques quickly locates malfunctioning tubes and thus greatly improves the effectiveness of the techniques and the efficiency of the equipment. Preferably, the equipment is cycled through a sample operation while the filament (or anode) supply voltage is lowered. Failure of a tube will produce an error in the equipment which will initiate a performance of the method of the invention as described above.

*Asynchronous, duplicate circuits*

In the event equipment, which is to be maintained in accordance with the method of the invention, includes one or more units not readily adapted to synchronous operation with their duplicates, care must be taken to assure that erroneous non-comparisons are not produced due to lack of synchronism between the units. For example, duplicate stepping switches may be pulsed from the same source and yet may step at different rates of speed, so that one switch will have completed a step while the other is still in the process of stepping. Preferably, such asynchronously operating means are caused to time the comparisons of the method of the invention through the medium of signals which are produced only when the both circuits have achieved steady states in which they can safely be compared. Stepping switches, for example, may produce signals when they have completed each step and these signals, in turn, may be combined to produce what may be termed a "ready" signal to time or gate the comparisons.

*Means of the invention*

A diagrammatic illustration of one form of the means of the invention as applied to the duplicate circuits S and T is provided in Fig. 1. As shown, the means include a Probe Comparator 100, a Marker Comparator 102, and switches 104 and 106 which constitute the Probe and Marker described above. These switches are advanced to connect the comparators with the several check point pairs of circuits S and T successively by actuators 108 and 110. Monitoring of the outputs of the duplicate circuits is accomplished by a Monitor Comparator 112 connected between check points 10 thereof.

The outputs of the comparators 100, 102 and 112 are applied to an Order in Time Circuit 114 which activates an output P whenever a non-comparison is detected by either comparator and an output M only when the Marker comparator detects the error first. The Order in Time Circuit also produces a stop signal on an output line 116 whenever an non-comparison is detected by either comparator. Line 116 may be connected to the duplicate circuits S and T in any suitable manner to halt operation thereof. For example, the line may be connected to relays adapted to open switches such as the switches X and Y of Fig. 5 in the input lines of the circuits.

The outputs M and P of the Order in Time Circuit 114 are applied to a Control Unit 118 which initiates an operation of actuator 108 whenever output P is activated and of actuator 110 whenever the output M is activated. The Control Unit 118 also produces a "Reset and Start" signal on an output line 120, which may be utilized in any suitable way to effect resetting of the equipment (circuits S and T) to any predetermined starting point and starting of the equipment at that point. For example, line 120 may be connected to a visual or audible indicator to notify the operator of the equipment that the latter is in condition to be reset and restarted manually. If desired, these signals could also be used to initiate normalizing of the equipment. The "Reset and Start" signals are also applied to the Order in Time Circuit to reset the same after each operation.

In the embodiment of the invention illustrated in Figs. 1–4 the Probe and Marker switches 104 and 106 comprise multiple-bank stepping switches. It will be understood, however, that if desired, manually operable switches or electronic switches or any other suitable switching means may be substituted for the stepping switches. The contacts of one bank 105 of each switch are connected individually to the check points of one of the circuits S or T while the contacts of another bank 107 are connected individually to the check points of the other circuit. The connections are such that as the rotors of banks 105 and 107 rotate they are electrically joined to the check points in the order in which the latter are to be scanned under the rules laid down above. The rotors for banks 105 and 107 of each switch are connected individually to the related comparator 100 or 102. In their normal or home positions, the rotors for banks 105 and 107 of the Probe are connected with the first check points to be scanned (points 10 in Figs. 1 and 5) while the rotors for banks 105 and 107 of the Marker are connected to blank positions in the contact banks. Thus the connections between the Probe contact banks 105 and 107 and the check points are offset one step with respect to the connections between the Marker contact banks 105 and 107 and the check points. In effect, banks 105 and 107 of the Probe are one step ahead of banks 105 and 107 of the Marker.

During each complete scanning operation the Probe rotors advance past all of the contacts which are connected to check points and come to rest on blank points in the banks 105 and 107. The Marker rotors, however, advance only as far as those contacts which are wired to the check points that designate a source of error.

It will be seen, therefore, that as the stepping switches 104 and 106 advance, the electrical conditions existing at corresponding check points in the duplicate circuits during an operation thereof are relayed to the comparators 100 and 102 which detect any disagreement. In the illustrated instance of the invention, the dual circuits S and T function at signal voltage levels of +60 and +90 volts which are the potentials applied to the comparators.

Figure 2:
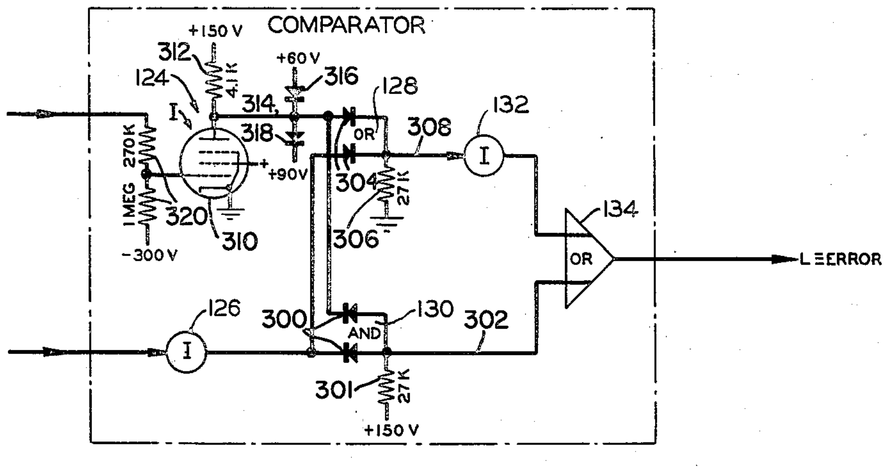
Fig. 2 is a logical circuit diagram of a portion of the means of Fig. 1 with certain circuits thereof being shown in detail.

The comparators 100 and 102 may be identical constructionally and in the interests of brevity a simple comparison circuit which may be duplicated for use in both said comparators is illustrated in Fig. 2. As indicated, the inputs to the comparators from the associated stepping switches are applied to buffer inverters or switch tube circuits 124 and 126 which in addition to providing gain, invert signals applied thereto. The output of each inverter is applied to an "Or" gate 128 and a coincidence gate 130. "Or" gate 128 controls an inverter 132 whose output is applied to an "Or" gate 134 along with the output of coincidence gate 130. The output line of the comparator is projected from the "Or" gate 134. The details of construction of the inverters and the coincidence and "Or" gates are immaterial. However, for the benefit of those who are not familiar with such circuits the inverter 124, and gates 128 and 130 are illustrated in detail in Fig. 2 and will be described in detail hereinafter.

The arrangement of the comparator is such that whenever high potentials are applied to both inverters 124 and 126 indicating that the check points of the duplicate circuits S and T under scrutiny at the moment, agree electrically, "Or" gate 128 produces a low potential which cuts off inverter 132 and applies a high potential to "Or" gate 134. This high potential is relayed to the output line of the circuit to indicate that the said check points agree electrically and that no error or non-comparison exists. When low potentials are applied to both inverters 124 and 126, coincidence gate 130 applies a high potential to "Or" gate 134 and the latter again produces a high output potential to indicate no error. However, when the inputs to the inverters 124 and 126 do not agree, that is, a high potential is found at a check point in one of the duplicate circuits and a low potential at a corresponding check point in the other circuit, coincidence gate 130 produces a low potential while "Or" gate 128 produces a high potential which effects conduction of inverter 132. The latter applies a low potential to gate 134 along with the low potential from gate 130 and, thus, a low potential is applied to the output line of the comparator to indicate that a non-comparison or error has been found.

If desired, the comparators 100 and 102 may be somewhat more complex to detect errors other than logical level disagreements, for example, departures from the logical levels.

The outputs of the comparators 100 and 102 are applied to "Or" gates 136 and 138 (Fig. 3), respectively, in the Order in Time Circuit. In order to effect sampling of the said outputs of the comparators at a specific point during each pulse period of the equipment being maintained, negatively directed timing pulses *t* which occur at appropriate times are also applied to the "Or" gates 136 and 138. Evidently, these gates can produce low outputs to indicate an error only when the input thereto from the associate comparator is at a low potential during the breadth of a timing pulse *t*.

The timing pulses *t* may be produced by any suitable pulse generating means 140 which are synchronized with the operation of the equipment being maintained. Preferably, the means 140 constitute the pulse generating means of said equipment or at least an addition thereto. In this simplest form the means 140 may comprise a switch closeable manually at appropriate times to apply a negative potential to the "Or" gates momentarily. In any event, the means 140 form no part of the invention and need not be described in detail it being deemed sufficient for a full understanding of the invention to point out that, given pulses of the sort indicated, the means of the invention are timed to compare electrical states at corresponding check points only during the breadth of the pulses.

Figure 3:
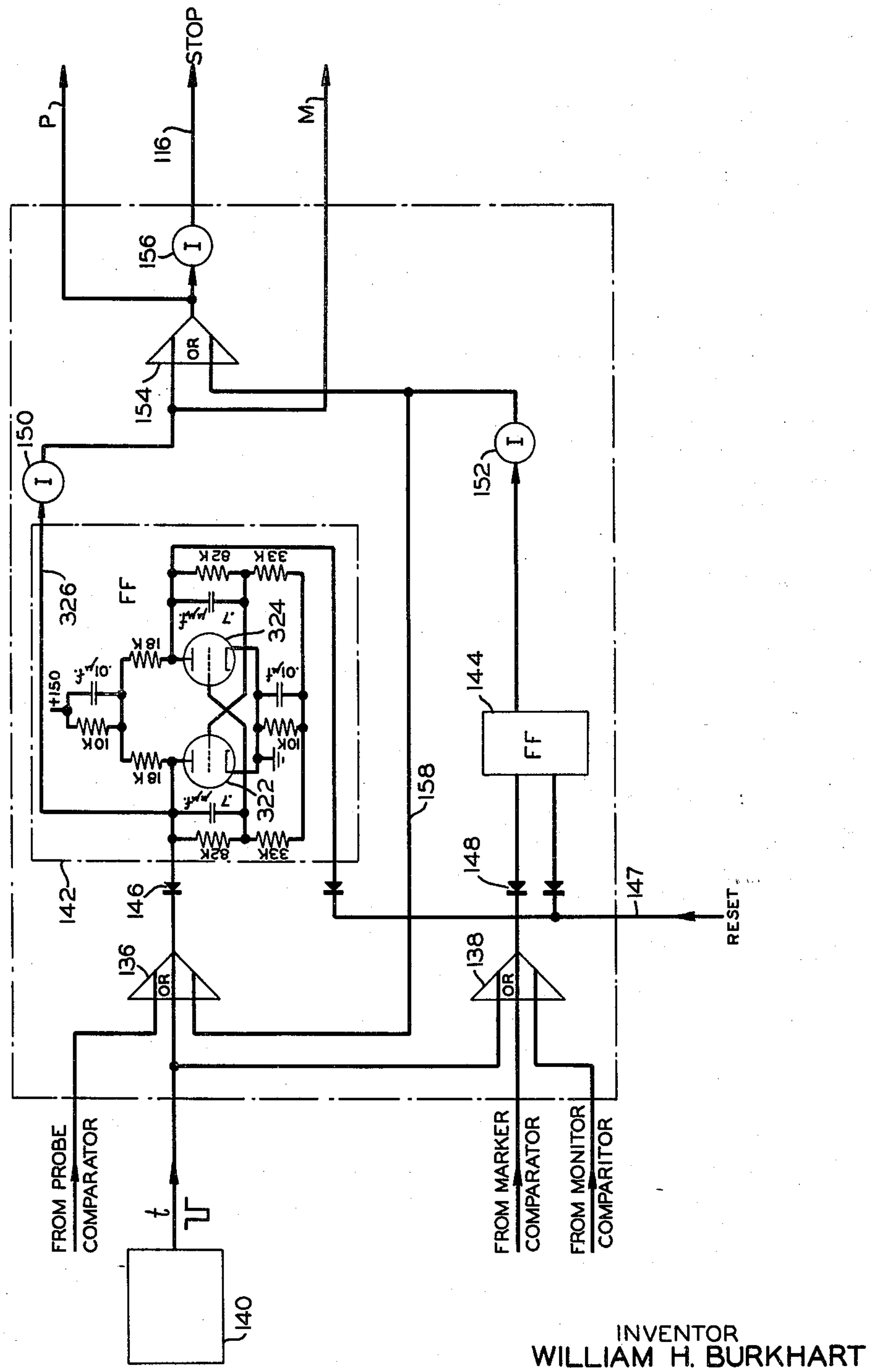
Fig. 3 is a logical circuit diagram of a portion of the means of Fig. 1 with certain circuits thereof being shown in detail.

The outputs of the "Or" gates 136 and 138, which, it will be remembered, assume a low potential to indicate errors or non-comparisons, are applied through isolating diodes 146 and 148 to flip-flops 142 and 144. Assumption of the low potential by either of gates 136 or 138 pulls the associated flip-flop to what may be termed its "set" state. The flip-flops are reset by a low potential appearing on a line 147, as will be more fully described hereinafter. The flip-flops may be of any suitable configuration but, by way of example, the one designated "142" in Fig. 3 is illustrated in detail and will be described hereinafter.

The outputs of the flip-flops 142 and 144 which assume low potentials when they are in the "set" state are applied to inverters 150 and 152, respectively. The output of inverter 150 constitutes the output M of the Order in Time Circuit mentioned above. The output P of this circuit is produced by an "Or" gate 154 to which the outputs of both of the inverters 150 and 152 are applied. Preferably, the output line 116 of the circuit which carries the "Stop" signals stems from inverter 156 driven by the "Or" gate 154.

In order to prevent setting of the flip-flop 142 once the flip-flop 144 has been "set" to indicate that the Marker Comparator detected a non-comparison or error first, the output of the inverter 152 controlled by flip-flop 144 is fed back to "Or" gate 136 over line 158. On "setting" of flip-flop 144 inverter 152 applies a high potential to "Or" gate 136, and a subsequent application of a low potential thereto by the Probe Comparator 100 is ineffective to "set" flip-flop 142. Preferably the leads of flip-flop 142 are shielded or other suitable measures are taken to prevent erroneous "settings" of the flip-flop by noise generated at the stepping switches or elsewhere.

Figure 4:
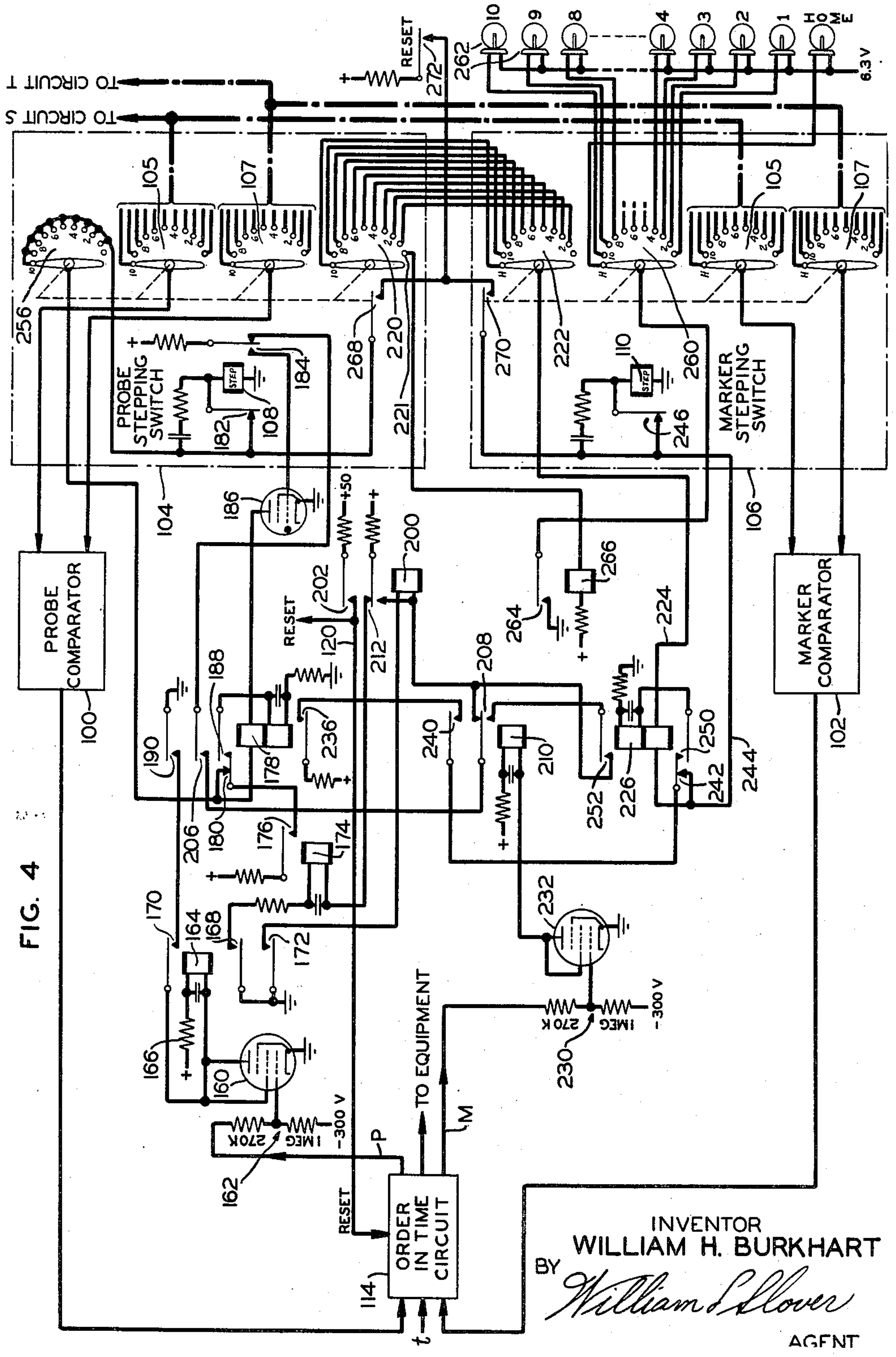
Fig. 4 is a detailed wiring diagram of means shown in block form in Fig. 1.

The outputs M and P of the Order in Time Circuit are applied to the Control Unit 118 as illustrated in Fig. 4.

The output P is used to effect conduction of a triode connected pentode 160 whenever the same is activated, i.e. assumes a high potential of 90 volts, and to maintain the pentode in the cutoff state when the output assumes a low potential of 60 volts. To this end, the control grid of the pentode is connected to the juncture of a pair of resistors comprising a voltage divider 162 connected between the output P and a source of −300 volts potential. The divider, as shown, converts the +90 and +60 volt potentials appearing on output P to potentials (+10 and −16 volts) more suitable for application to the grid of the tube. The anode of the pentode is connected to a source of suitable positive potential through a current limiting resistor 166 and the coil of a "Start" relay 164 which is energized on conduction of the tube to close its contacts 168, 170 and 172. Closure of contacts 168 completes the ground return path for a relay 174 which becomes energized and closes its contacts 176. These contacts 176 then connect positive supply to a first winding of a double-wound relay 178, through normally closed contacts 180 of this relay, and through normally closed interrupter contacts 182 of the Probe stepping switch 104, to the stepping magnet or actuator 108 of this switch. Actuator 108 is energized immediately and in familiar fashion the switch advances on later release thereof. Also, through a momentary operation of a transfer contact 184 of the stepping switch a positive potential is applied to the control grid of a thyratron 186 which fires and provides ground return for the previously mentioned first coil of relay 178. Also, the thyratron path "shorts" magnet 108 to prevent further energization thereof. Relay 178 becomes energized and provides a holding circuit for itself through contacts 188 which, in cooperation with the contacts 176 of relay 174, connect its second winding to positive supply. At the same time, the contacts 180 of this relay are opened to prevent a second actuation of the Probe stepping switch which thus advances only one step. Opening of these contacts 180 also deenergizes the first coil of relay 178 and quenches thyratron 186. Simultaneously, another pair of contacts 190 of relay 178 are closed and in cooperation with closed contacts 170 of relay 164 provide a ground return holding circuit for the latter relay.

As pointed out hereinabove, a "Reset" signal is produced on output line 120 of Control Unit 118 (Figs. 1 and 4) following each operation of the Probe 104. To this end, a "Reset" relay 200 (Fig. 4) is provided with contacts 202 which connect line 120 with a source of suitable positive potential whenever the relay is energized. An energization circuit for this relay can be traced from the transfer contact 184 of the Probe, contacts 206 of relay 178, transfer contact 208 of a relay 210, the coil of relay 200 and contacts 172 of relay 164 to ground. On deenergization of the Probe magnet 108, transfer contact 184 is normalized and connects the said energization path to positive supply. This energizes relay 200 which completes a holding circuit for itself through a transfer contact 212 thereof. Transfer of contact 212 interrupts the holding circuit for relay 174 which becomes deenergized and, through opening of its contacts 176, interrupts the holding circuit for relay 178. On deenergization of relay 178, its contacts 190 open and interrupt the holding circuit for Start relay 164 which is deenergized and through opening of its contacts 172 interrupts the holding circuit for Reset relay 200 to effect deenergization of the latter.

At this point, the circuits thus far described are normalized.

In order to advance the Marker, the outputs M of the Order in Time Circuit are applied through a voltage divider 230, similar to the divider 162 described above, to a triode connected pentode 232 which conducts when the said output is activated, i.e. when it assumes a high potential. The relay 210 mentioned above, is connected in the anode circuit of pentode 232 and is energized on conduction of the latter. Remembering that the output M is activated only in coincidence with the activation of the output P, it will readily be seen that whenever the relay 210 is energized the relays 164, 174 and 178 are also energized as described above. On energization of relays 178 and 210, contacts 236 and 240 thereof are closed and in cooperation with normally closed contacts 242 of a double wound relay 226, complete a path from positive supply to a first coil of relay 226. At the same time this path is extended via a lead 244 to the magnet 110 of the Marker stepping switch through the interrupter contacts 246 of the latter. Magnet 110 is energized one or more times as required to advance the Marker to the step occupied by the Probe in which step, it will be remembered, it scans the check points last scanned by the Probe, not the points currently being scanned by the latter.

In order to halt the advance of the Marker at the appropriate step, the Probe and the Marker are provided with third banks of contacts 220 and 222, respectively. Bank 220 is provided with a contact in each position in which the Probe scans a pair of check points and also with a final contact 221 to be more fully discussed hereinafter. The rotor for bank 220 is grounded, and each contact of the bank is connected to a correspondingly positioned contact in bank 222. The rotor for bank 222 is connected by a lead 224 with the first coil of relay 226 which, it will be remembered, is connected to positive supply whenever the Marker is advanced.

It will readily be seen, that when the Marker is advanced to the step occupied by the Probe, ground potential is applied through the interconnected contact banks 220 and 222 and the lead 224 to the first coil of relay 226 which becomes energized. This closes contacts 250 of the relay to provide a holding circuit for the latter and opens the contacts 242 thereof to prevent further energizations of the Marker stepping switch magnet 110. It will be noted, however, that the latter was "shorted" by the ground return path for relay 226 and would not be energized again if said relay failed in some way.

As described above, the Reset relay 200 is energized immediately following a single step of the Probe stepping switch when the latter is actuated exclusively of the Marker. When the Marker stepping switch is also operated, however, operation of the Reset relay is delayed until after the Marker stepping switch has also finished its advance. To this end, the normal energization path for relay 200 through transfer contact 208 is broken by energization of relay 210 preparatory to an advance of the Marker, and a second path introduced which also includes normally open contacts 252 of relay 226. This relay, it will be remembered, is deenergized when the Marker completes its advance. Thus, the energization path for relay 200 is not completed until the relay 226 is energized to close the contacts 252. Once this action does occur, however, the Reset relay is energized with the results described above. Also, on deenergization of the relay 178 during the resetting operation, contacts 236 are opened to disconnect positive supply from relay 226 which also becomes deenergized. Relay 210 is deenergized when, following application of the reset signal to the Order in Time Circuit 114, the output M thereof is deactivated.

In order to disable the Probe after it has scanned the last check points to be compared, the positive supply connection for the Probe magnet 108 through the relay contacts 176 and 180 is broken at such time. To this end, the Probe stepping switch includes a fourth contact bank 256 having a contact for each position in which the switch scans a pair of check points. These contacts are connected in common with Probe magnet 108 (through interrupter contacts 182) while the rotor therefor is connected to positive supply through the contacts 180 and 176. Thus the described mode of operation of the Probe magnet 108 under control of contacts 176 and 180 continues undisturbed until, subsequently to scanning the last check points to be compared, the Probe advances an additional step and the rotors for contact banks 105, 107 and 256 occupy blank positions in the banks. At this time, the connection between the Probe magnet and contacts 176 and 180 is broken and the Probe is disabled.

In order to indicate to an operator of the equipment the check points selected by the means of the invention as the most indicative of the source of errors, the Marker stepping switch 106 is provided with a fourth contact bank 260 having a contact for each position in which the switch scans a pair of check points. These contacts are individually connected to indicator lamps 262 which designate the various check points and which are connected in common to a source of positive supply. The lamps are illuminated selectively by connecting them to ground individually through the rotor for bank 260. Preferably the lamps 262 are not illuminated successively as the Marker advances. Instead the lamp which designates the check points most indicative of the source of errors is illuminated after the Marker has completed its advance. To this end, the rotor of contact bank 260 is connected to ground through normally open contacts 264 of a relay 266. The ground return path for this relay is completed through the final contact 221 of bank 220 of the Probe and the associated rotor which engages the same after the Probe has scanned all of the check points. Thus relay 266 is energized after the Probe has completed its advance and completes the illuminating circuit for the appropriate lamp 262 through its contacts 264.

In order to home the stepping switches 104 and 106 after the location of a faulty circuit component has been ascertained from the lamps 262, the magnets 108 and 110 thereof may be connected with positive supply in any suitable way. For example, as shown in Fig. 4 the Probe stepping switch includes contacts 268, which are opened only when the switch is in its home position. A similar set of contacts 270 provided in the Marker stepping switch, are connected in common therewith to a manually operable Reset switch 272 which, on being operated, applies positive potential through said contacts to the magnets 108 and 110 to home the stepping switches.

In some instances it may be desirable to utilize a single diagnostic unit such as that just described in association with a plurality of separate pieces of esuipment. To this end, the wiring connections between the diagnostic unit and the equipment with which it is associated as in Fig. 1, may be of the "plug in" variety or may otherwise be arranged to facilitate connection of the diagnostic unit with any of the pieces of equipment. Further, where all of the pieces of equipment, or at least the parts thereof which are associated with the diagnostic unit, are substantially identical, a considerable saving in equipment can be realized by not duplicating the circuits therein, but instead utilizing one of the pieces of equipment as the duplicate of another for the purpose of locating a malfunctioning part of one of them. In this arrangement, each piece of equipment may be checked for errors in any of several known ways other than output monitoring. For example, programmed checks may be used, or the equipment may be caused to perform each operation twice and to check as to whether the same results are obtained both times, or parity checks or any other checking techniques familiar to those skilled in the electronic computer and allied arts may be used. Also, if desired, an additional said piece of equipment or a "mock up" thereof may be provided, for use as the duplicate of a faulty one so as not to interfere with the normal operation of the other pieces of equipment. In connection with the use of a "mock up" of a piece of equipment, it is to be mentioned that where the nature of the equipment permits, the duplicate circuits which are used, or the "mock up," may be substantially different from the piece of equipment to be diagnosed, so long as for a particular predetermined test operation the two appear identical to the diagnostic unit. For example, a comparatively simple "mock up" of a complex circuit may be designed such that during a selected operation of the two, the electrical states at the check points of the former compare with those at corresponding check points of the latter except on the occurrence of an error. The said selected operation would, of course, be one which could reproduce any error detected by the checking system and would always be used for diagnosis in place of whatever operation the equipment was performing on the occurrence of the error. A simple "mock up" of a circuit may comprise an actual circuit or a recording of the electrical states that the check points of a piece of equipment should assume during the pulse periods of a particular operation, which recording can be played back for comparison with the electrical states that are assumed during a said operation, etc.

Still other changes may be made in the diagnostic method and means of the invention to meet individual users' requirements. For example, where uninterrupted operation of equipment is of extreme importance, it may be provided with triplicate circuits, and with an output monitor capable of coupling any one of the circuits which produces an output different from the other two with either of said other two for diagnostic purposes while permitting uninterrupted operation of the third. Diagnostic means of the sort described hereinabove would be provided for cooperation with the coupled circuits in locating the malfunctioning component while the third circuit continued its normal operation. Also, instantaneous location of faulty circuits can be obtained by connecting a comparator between each pair of check points and using circuitry similar to the described Order in Time Circuit to block action by any other comparator once one detects a non-match.

While there has been above described but a limited number of embodiments of the invention, many modifications and additions may be made therein without departing from the spirit of the invention and it is not desired therefore, to limit the scope of the invention except as set forth in the appended claims or as dictated by the prior art.

*Appendix*

The following described circuits are illustrative of suitable circuits for use in the correspondingly labeled blocks of Figs. 1–4. It will be understood that the components and specific arrangements shown represent simply one possible combination and no limitation on the scope of the invention is intended. Minor changes in D.C. levels, signal amplitudes, impedances and changes in the pulse polarity may be necessary for the use of these circuits at particular places, but such changes will be apparent to those skilled in the electronic art.

The coincidence gate 130 shown in detail in Fig. 2 typifies those shown in block form throughout the drawing. As illustrated, the gate comprises a pair of diodes 300 having their anodes coupled together. A resistor 301 is connected between the coupled anodes and a source of positive potential, say +150 volts. An output line 302 for the circuit is projected from the coupled anodes. High (+90 volts) and low (+60 volts) potentials are applied to the cathodes of the diodes. Coincidence application of high potentials to both inputs effects application of a high potential to line 302. When either or both of the inputs are low, output line 302 also assumes a low potential. Where needed, more than two diodes 300 may be provided.

Referring again to Fig. 2 the "Or" gate 128 typifies the "Or" gates shown in block form throughout the drawing. As illustrated, the gate comprises a pair of diodes 304 having their cathodes coupled together. A resistor 306 connects the coupled cathodes to ground. An output line 308 is projected from the coupled cathodes and assumes a high potential whenever a high potential is applied to the anode of either or both of the diodes. Output line 308 assumes a low potential only when both inputs are low. Where needed, more than two diodes 304 may be provided.

In coupling together a plurality of diode gates of the sort just described, each is especially designed to function on the same signal level as the preceding one; and at intervals in the coupling amplifier means are provided to compensate for power losses. In order to maintain the described high and low signal potentials throughout a series of the described gates, the resistors of the circuits of the series are of substantially different magnitudes. For example, an amplifier may be provided after every third logic circuit of a series and 27,000 ohms, 51,000 ohms and 100,000 ohms resistors may be used for the first, second and third circuits, respectively, of each group of three.

Still referring to Fig. 2 the switch circuit or inverter 124 shown in detail typifies other switch circuits shown in block form throughout the drawing and comprises an amplifier of the sort mentioned above. As illustrated, the switch circuit includes a power pentode 310 whose cathode and suppressor grid are grounded and whose screen grid is connected to a source of suitable positive potential. The anode of the pentode is connected through a resistor 312 to a source of +150 volts. An output line 314 is extended from the anode of the pentode and is clamped by means of diodes 316 and 318 to potentials of +60 and +90 volts, respectively. The control grid of the pentode is connected to the juncture of the two resistors of a voltage divider 320, connected between the input line of the circuit and a source of −300 volts potential. Divider 320 serves to convert the +90 and +60 volts potential appearing on the input line of the circuit to potentials (+10 and −16 volts) more suitable for application to the grid. Using the tube type and the component values indicated in the drawing, the application of a high potential to its input line results in a low output on line 314. Conversely, application of a low potential to the input line results in the production of a high potential on output line 314.

Referring now to Fig. 3 the flip-flop 142 shown in detail comprises the very familiar grid-to-plate coupled pair of triodes 322 and 324 which have two stable states, i.e. either triode conducting with the other triode cutoff. The flip-flop unit also includes a pair of isolating diodes each having its anode connected to the anodes of one of the flip-flop triodes, as indicated at 146. The outputs from the flip-flop are taken from the anodes of its triodes as at 326. Application of a low potential (+60 volts) to the cathode of the isolating diode connected with the non-conducting triode pulls the anode potential of the latter down to the 60 volts level and the state of the flip-flop is changed in well known manner. The design and mode of operation of flip-flops are so well known in the art that the same will not be described further. Further information on this type of circuit may be found in the article "How to Design Bistable Multivibrators" by Ralph Prissman in Electronics magazine for April 1953, pages 164–167.

I claim:

1. Means for diagnosing the functional ills of electrical and electronic equipment embodying duplicate circuits which include corresponding check points, comprising, first means for detecting disagreements between a pair of check points, second means for detecting disagreements between a pair of check points, order-in-time means for detecting the relative order in which the first and second means detect disagreements, means for advancing the first means to examine another pair of check points when either the first means or the second means detects a disagreement, means controlled by the order-in-time means for advancing the second means to examine the points last examined by the first means when the first means detects a disagreement before the second means, and means for indicating the points being examined by the second means.

2. Means for diagnosing the functional ills of electrical and electronic equipment embodying duplicate circuits which include corresponding check points, comprising, first means for detecting disagreeements between a pair of check points, second means for detecting disagreements between a pair of check points, order-in-time means for detecting the relative order in which the first and second means detect disagreements, means for advancing the first means to examine another pair of check points when either the first or the second means detects a disagreement, means controlled by the order-in-time means for advancing the second means to examine the points last examined by the first means when the first means detects a disagreement before or at the same time as the second means, and means for indicating the points being examined by the second means.

3. Means for diagnosing the functional ills of electrical and electronic equipment which includes check points comprising, means for simulating the electrical conditions which should occur at the check points, first means for detecting disagreements between the electrical condition at a check point and that which should exist at the point, second means for detecting such disagreements, order-in-time means for detecting the relative order in which the first and second detecting means detect disagreements, means for advancing the first detecting means to examine another check point when either the first or the second detecting means detects a disagreement, means controlled by the order-in-time means for advancing the second detecting means to examine the points last examined by the first detecting means when the first detecting means detects a disagreement before the second detecting means, and means for indicating the point being examined by the second detecting means.

4. Means for diagnosing the functional ills of electrical and electronic equipment which includes check points comprising, means for simulating the electrical conditions which should occur at the check points, first means for detecting disagreements between the electrical condition at a check point and that which should exist at the point, second means for detecting such disagreements, order-in-time means for detecting the relative order in which the first and second detecting means detect disagreements, means for advancing the first detecting means to examine another check point when either the first or the second detecting means detects a disagreement, means controlled by the order-in-time means for advancing the second detecting means to examine the point last examined by the first detecting means when the first detecting means detects a disagreement before or at the same time as the second detecting means, and means for indicating the point being examined by the second detecting means.

5. Means for diagnosing the functional ills of electrical and electronic equipment embodying duplicate circuits which include corresponding check points, comprising, means for detecting a failure of either circuit and for initiating a recycling of the equipment through the operation which produced the failure, first and second means for detecting disagreements between the corresponding check points of each of two pairs of points during each recycling, order-in-time means for determining the relative order in which the first and second means detect disagreements, means for advancing the first means to examine another pair of check points when either the first or the second means detects a disagreement, means controlled by the order-in-time means for advancing the second means to examine the points last examined by the first means when the first means detects a disagreement before the second means, and means for indicating the points being examined by the second means.

6. The combination according to claim 5 wherein the first and second detecting means each includes a comparison circuit, each comparison circuit comprises a coincidence gate and an Or gate to which the potentials at the check points being examined are applied, an inverter controlled by the Or gate and a second Or gate controlled by the inverter and the coincidence gate.

7. The combination according to claim 5 wherein the first and second means each includes a comparison circuit for comparing the electrical states at corresponding check points, and switching means for connecting the comparison circuit with the pairs of check points sequentially, and wherein the outputs of the comparison circuits are applied to the order-in-time means and the latter includes a pair of flip-flops of which a first is set to one state on detection of a disagreement by the comparison circuit of the first means and the second is set to one state on detection of a disagreement by the comparison circuit of the second means, a gate through which the first flip-flop is set, and a feedback circuit from the second flip-flop to said gate to block setting of the first flip-flop once the second flip-flop is set.

8. The combination according to claim 7 and including means controlled by the flip-flops to initiate stopping of the equipment on setting of either of them.

9. The combination according to claim 7 and including a control circuit controlled by the flip-flops, comprising a first circuit activated on setting of either flip-flop and effective to actuate the advancing means for the first means, a second circuit activated on setting of the second flip-flop and effective to actuate the advancing means for the second means, and a reset circuit operable after each advance of the second means or of the first means if the second means is not advanced to reset the first circuit, to produce a signal to reset whichever of the flip-flops is set in said one state and to institute a recycling of the equipment through the operation which produced a failure thereof.

10. The combination according to claim 9 wherein the switching means which connect the check points with the comparison circuits sequentially, comprise stepping switches each having a bank of contacts individually connected to the check points of each of the duplicate circuits, and the means for advancing the same comprise the stepping magnets thereof, and wherein the means for indicating the points being examined comprise a series of indicator lamps and a third contact bank of the second means stepping switch whose contacts are individually connected to the lamps to effect selective illumination thereof.

11. The combination according to claim 10 and including an additional contact bank on each of the stepping switches, interconnections between the contacts of these banks, and a circuit completed through these interconnections when the second means advances to the check points last scanned by the first means, to block further energization of the stepping magnet of the second means by the said second circuit.

12. The combination according to claim 11 wherein the said first circuit for activating the first means stepping magnet includes a fourth contact bank of the first means stepping switch having interconnected contacts in all positions in which the first means examines check points, and the rotor for said bank, said first circuit being broken to prevent further advance of the first means when the rotor passes the last interconnected contact.

13. The combination according to claim 12 wherein the illuminating circuit for the indicator lamps includes switching means to complete the circuit on activation thereof, and means controlled by the first means stepping switch to activate the last said switching means only after all of the check points have been examined.

14. The combination according to claim 13 and including switching means for homing the stepping switches.

15. Means for diagnosing the functional ills of electrical and electronic equipment embodying duplicate circuits which include corresponding check points, comprising, means for detecting a failure of either circuit and for initiating a recycling of the equipment through the operation which produced the failure, first and second stepping switches each having a stepping magnet and a bank of contacts individually connected to the check points of each of the duplicate circuits, a comparison circuit controlled by the said banks of each switch and effective to detect a disagreement between corresponding check points, an order-in-time circuit to detect which of the comparison circuits detects a disagreement first and effective to produce a first output whenever either detects a disagreement and a second output whenever the comparison circuit associated with the first stepping switch detects a disagreement before the second, a control circuit activated by the first output to effect an advance of the first stepping switch to examine the next check points and activated by the second output to effect an advance of the second stepping switch to examine the check points last examined by the first stepping switch, and means for indicating the check points being examined by the second stepping switch.

16. The combination according to claim 15 wherein the control means comprises a first switching circuit actuated by said first output to energize the stepping magnet for the first stepping switch, a second switching circuit for blocking energization of said magnet, means operated by said magnet on energization thereof to actuate said second switching circuit; a third switching circuit actuated by said second output to energize the stepping magnet for the second stepping switch, a fourth switching circuit to block further energization of the last said magnet when the second stepping switch is in position to examine the check points last examined by the first stepping switch, means to actuate the fourth switching circuit including third contact banks on the stepping switches, interconnections between the contacts of these banks, and an actuating circuit completed through these interconnections when the second stepping switch advances into position to examine the check points last examined by the first stepping switch, and a reset switching circuit actuated by the means for actuating the second switching circuit, following deenergization of the magnet of the first stepping switch, said reset circuit effecting normalizing of the order-in-time circuit and the first, second, third and fourth switching circuits and producing a reset signal to institute a recycling of the equipment through the operation which produced a failure thereof.

17. The combination according to claim 16 wherein the third switching circuit, when actuated, opens the actuating circuit for the reset switching circuit and the fourth switching circuit includes means to bridge the opening in the actuating circuit when the fourth switching circuit is actuated.

18. The combination according to claim 17 wherein the first switching circuit includes a fourth contact bank of the first stepping switch having interconnected contacts in all positions of the switch in which the latter examines check points, and the rotor for the fourth bank, the said first switching circuit thereby being prevented from energizing the stepping magnet for the first stepping switch after the last check points to be compared have been examined.

19. The combination according to claim 18 wherein the means for indicating the check points being examined by the second stepping switch include a series of indicator lamps, a fourth contact bank of the second stepping switch having its contacts individually connected to the lamps to effect illumination thereof selectively, and the rotor for this contact bank.

20. The combination according to claim 19 wherein the means for indicating the check points being examined include an additional switching circuit normally blocking illumination of any lamp, and means controlled by the first stepping switch to activate said additional switching circuit to permit illumination of a selected lamp after the last check points to be compared have been examined thereby.

References Cited in the file of this patent

UNITED STATES PATENTS 2,628,346 Burkhart _______________ Feb. 10, 1953

OTHER REFERENCES

West et al.: Article entitled, "A Digital Computer for Scientific Applications," Proceedings of the I.R.E., December 1948, pages 1452–1460.

Auerback et al.: Article entitled, "The Binac," Proceedings of the I.R.E., January 1952, pages 12–28.

UNITED STATES PATENT OFFICE

CERTIFICATE OF CORRECTION

February 16, 1960

Patent No. 2,925,591

William Henry Burkhart

It is hereby certified that error appears in the printed specification of the above numbered patent requiring correction and that the said Letters Patent should read as corrected below.

Column 3, line 6, after "be", second occurrence, insert -- an --; line 21, after "of" insert -- said --; same column 3, line 56, for "appearance" read -- appearances --; column 4, line 5, for "one" read -- on --; line 18, for "circiuts" read -- circuits --; column 8, line 63, for "an" read -- a --; column 10, line 37, for "this" read -- its --; column 13, line 54, for "esuipment" read -- equipment --; column 16, line 41, for "points" read -- point --.

Signed and sealed this 15th day of November 1960.

(SEAL)
Attest:

KARL H. AXLINE
Attesting Officer

ROBERT C. WATSON
Commissioner of Patents